United States Patent
Kanazawa et al.

(10) Patent No.: US 10,850,617 B2
(45) Date of Patent: Dec. 1, 2020

(54) ELECTRICITY SUPPLY CONTROL APPARATUS, VEHICLE, AND ELECTRICITY SUPPLY CONTROL METHOD

(71) Applicant: HONDA MOTOR CO., LTD., Tokyo (JP)

(72) Inventors: Hiroyuki Kanazawa, Wako (JP); Hakaru Sadano, Wako (JP); Hajime Fujita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 339 days.

(21) Appl. No.: 15/238,727

(22) Filed: Aug. 17, 2016

(65) Prior Publication Data

US 2017/0050534 A1 Feb. 23, 2017

(30) Foreign Application Priority Data

Aug. 19, 2015 (JP) .................................. 2015-162045

(51) Int. Cl.
*B60L 11/18* (2006.01)
*B60L 1/00* (2006.01)
(Continued)

(52) U.S. Cl.
CPC ................ *B60L 1/006* (2013.01); *B60L 3/12* (2013.01); *B60L 58/30* (2019.02);
(Continued)

(58) Field of Classification Search
CPC ................................ Y02T 90/34; Y02T 90/32
See application file for complete search history.

(56) References Cited

U.S. PATENT DOCUMENTS

| 2004/0062963 A1* | 4/2004 | Umayahara ......... B60L 11/1881 429/429 |
| 2006/0185756 A1* | 8/2006 | Sato ........................ B60S 5/02 141/94 |

(Continued)

FOREIGN PATENT DOCUMENTS

| JP | 2002-216296 | 8/2002 |
| JP | 2002-315111 | 10/2002 |

(Continued)

OTHER PUBLICATIONS

EPO translation of Tsutomu, JP2017033862 (A) (May 10, 2018) (Year: 2015).*

(Continued)

*Primary Examiner* — Kevin P Mahne
(74) *Attorney, Agent, or Firm* — Mori & Ward, LLP

(57) ABSTRACT

A selector is to choose a target facility from the at least one facility based on a supplier position and a quantity of the energy suppliable. A distance calculator is to calculate a vehicle-facility distance from a current position to a facility position of a target energy supplier. A drivable range calculator is to calculate a drivable range of a vehicle based on a quantity of energy stored in an energy storage. A determining device is to determine whether or not to permit a power supplier to supply an electrical energy to an external device based on the vehicle-facility distance and the drivable range to control electricity supply from the power supplier to the external device.

20 Claims, 5 Drawing Sheets

(51) Int. Cl.
 B60L 3/12 (2006.01)
 B60L 58/30 (2019.01)
 G01C 21/34 (2006.01)
(52) U.S. Cl.
 CPC ....... *B60L 2240/62* (2013.01); *B60L 2260/44* (2013.01); *B60L 2260/52* (2013.01); *G01C 21/3469* (2013.01); *G01C 21/3476* (2013.01); *H01M 2250/20* (2013.01); *Y02T 10/70* (2013.01); *Y02T 10/72* (2013.01); *Y02T 90/16* (2013.01); *Y02T 90/40* (2013.01)

(56) References Cited

U.S. PATENT DOCUMENTS

| | | | | |
|---|---|---|---|---|
| 2009/0026841 | A1* | 1/2009 | Nakanishi | H02J 3/005 307/66 |
| 2010/0169008 | A1* | 7/2010 | Niwa | B60L 3/12 701/532 |
| 2012/0109409 | A1* | 5/2012 | Hara | B60L 11/1824 701/1 |
| 2012/0166012 | A1 | 6/2012 | Lee et al. | |
| 2013/0257145 | A1 | 10/2013 | Caldeira et al. | |
| 2013/0282265 | A1 | 10/2013 | Arita et al. | |
| 2014/0049207 | A1* | 2/2014 | Nakagawa | B60L 11/1824 320/103 |
| 2014/0080022 | A1* | 3/2014 | Kim | H01M 8/04365 429/431 |
| 2014/0285154 | A1* | 9/2014 | Mohagheghi | H02J 3/006 320/127 |

FOREIGN PATENT DOCUMENTS

| | | | |
|---|---|---|---|
| JP | 2002-373230 | 12/2002 | |
| JP | 2009-254145 | 10/2009 | |
| JP | 2012-016197 | 1/2012 | |
| JP | 2014-007835 | 1/2014 | |
| JP | 2015-060570 | 3/2015 | |
| JP | 2017033862 | * 8/2015 | |

OTHER PUBLICATIONS

Japanese Office Action for corresponding JP Application No. 2015-162045, dated Sep. 11, 2018 (w/ machine translation).

Office Action with Form PTO-892 Notice of References Cited issued by the U.S. Patent and Trademark Office for the U.S. Appl. No. 16/045,741, dated Jul. 28, 2020.

* cited by examiner

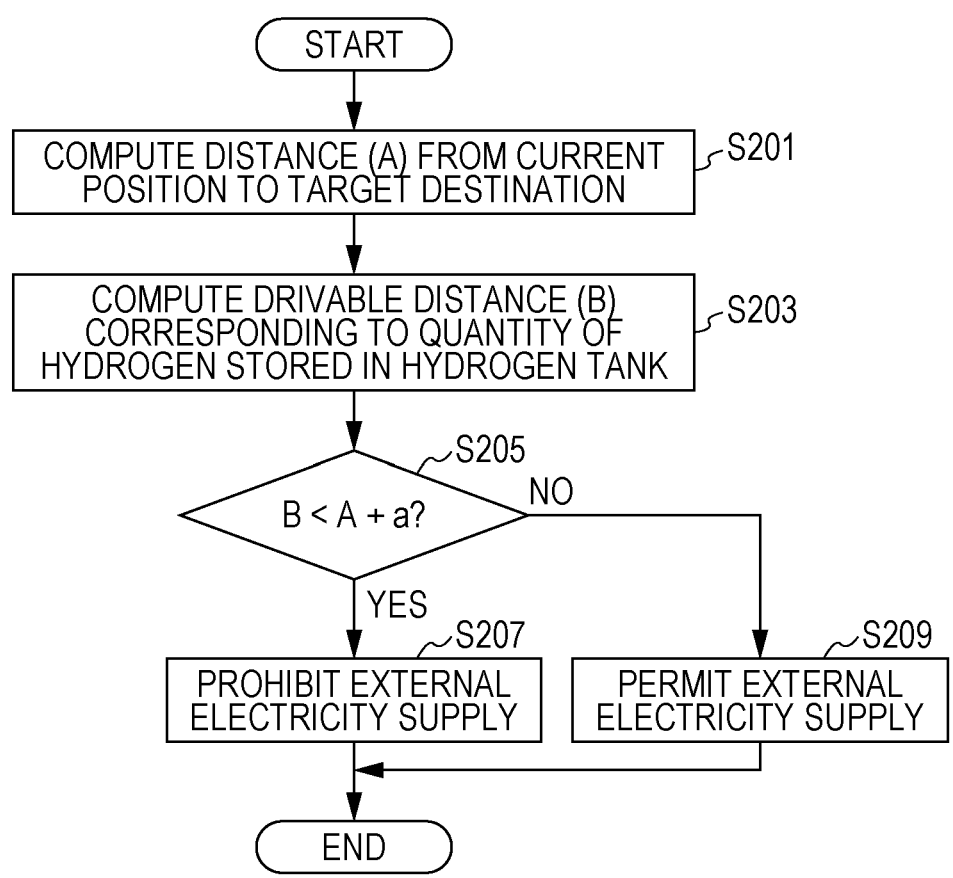

ELECTRICITY SUPPLY CONTROL APPARATUS, VEHICLE, AND ELECTRICITY SUPPLY CONTROL METHOD

CROSS REFERENCE TO RELATED APPLICATIONS

The present application claims priority under 35 U.S.C. § 119 to Japanese Patent Application No. 2015-162045, filed Aug. 19, 2015, entitled "Electricity Supply Control Apparatus, Transporter, and Electricity Supply Control Method." The contents of this application are incorporated herein by reference in their entirety.

BACKGROUND

Field of the Invention

The present disclosure relates to an energy supply control apparatus, a vehicle, and an electricity supply control method.

Discussion of the Background

There is an electricity supply control apparatus described in Japanese Unexamined Patent Application Publication No. 2014-007835 for electric vehicles installed with a power supply device that outputs power externally. The electricity supply control apparatus controls power supply to the power supply device so as to give certainty that an electric vehicle will be able to run as far as a reference location the electric vehicle is scheduled to arrive at, even if the power supply device is utilized at an en route location of the electric vehicle. Such an electricity supply control apparatus includes an electricity supply control unit that computes the amount of power to be consumed by the electric vehicle as it runs from the current en route location to the target destination (reference location) as a residual power quantity set value, and controls the power supply device to stop power supply when the current residual power quantity of the electric vehicle has dropped below the residual power quantity set value. Note that the reference location to be set as the target destination is referred to generically as a location capable of charging the power source of the electric vehicle, and indicates a return point such as a home, or a point other than at home where a charger device capable of charging is installed.

There is an electrically powered vehicle drive plan generation device described in Japanese Unexamined Patent Application Publication No. 2015-060570 that is capable of generating a drive plan that satisfies a specific limitation based on charging load of charging equipment. The drive plan generation device includes a prediction unit and a generating unit. When there are plural electrically powered vehicles driving according to drive plans, the prediction unit predicts the charging power required at charging points for each time slot, in order to charge the storage batteries installed in each of the electrically powered vehicles at the plural charging points disposed along the drive path of the electrically powered vehicles. The generating unit employs the prediction unit to generate drive plans for the plural electrically powered vehicle so as to satisfy a specific limitation related to at least one out of charging points and storage batteries.

SUMMARY

According to one aspect of the present invention, an electricity supply control apparatus includes a storing section that stores energy, a conversion section that converts the energy into electrical energy different from the energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the energy. The control section sets one facility from out of the at least one facility as a target destination based on a position of the facility and on a quantity of the energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the energy stored in the storing section.

According to another aspect of the present invention, an electricity supply control method performed by an electricity supply control apparatus includes a storing section that stores energy, a conversion section that converts the energy into electrical energy different from the energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the energy. In the electricity supply control method, the control section sets one facility from out of the at least one facility as a target destination based on a position of the facility and on a quantity of the energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the energy stored in the storing section.

According to still another aspect of the present invention, an electricity supply control device includes a storing section that stores electrical energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the electrical energy. The control section sets one facility from out of the at least one facility as a target destination based on a position of the facility and on a quantity of the electrical energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the electrical energy stored in the storing section.

According to further aspect of the present invention, an electricity supply control method performed by an electricity supply control apparatus includes a storing section that stores electrical energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the electrical energy. In the electricity supply control method, the control section sets one facility from out of the at least one facility as a target destination based on a position of the facility and on a quantity of the electrical energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the electrical energy stored in the storing section.

According to further aspect of the present invention, an electricity supply control apparatus includes an energy storage, an energy converter, a power supplier, an information acquiring device, a selector, a distance calculator, a drivable range calculator, a determining device. The energy storage is to store energy. The energy converter to convert the energy into electrical energy. The power supplier is to supply the electrical energy to a drive source of a vehicle and to an external device external to the vehicle. The information acquiring device is to acquire vehicle position information regarding a current position of the vehicle and facility information regarding at least one facility which is located within a threshold distance from the current position and at which the energy is to be supplied to the energy storage. The facility information includes a facility position where the at least one facility is located, and a quantity of the energy suppliable at the at least one facility. The selector is to choose a target facility from the at least one facility based on the supplier position and the quantity of the energy suppliable. The distance calculator is to calculate a vehicle-facility distance from the current position to the facility position of the target energy supplier. The drivable range calculator is to calculate a drivable range of the vehicle based on a quantity of the energy stored in the energy storage. The determining device is to determine whether or not to permit the power supplier to supply the electrical energy to the external device based on the vehicle-facility distance and the drivable range to control electricity supply from the power supplier to the external device.

According to further aspect of the present invention, an electricity supply control method includes receiving vehicle position information regarding a current position of a vehicle and facility information regarding at least one facility which is located within a threshold distance from the current position and at which the energy is to be supplied to an energy storage. The energy stored in the energy storage is converted into electrical energy to be supplied to a drive source of a vehicle and to an external device external to the vehicle. The facility information includes a facility position where the at least one facility is located, and a quantity of the energy suppliable at the at least one facility. The electricity supply control method includes choosing a target facility from the at least one facility based on the facility position and the quantity of the energy suppliable, calculating a vehicle-facility distance from the current position to the facility position of the target facility, calculating a drivable range of the vehicle based on a quantity of the energy stored in the energy storage, and determining whether or not to supply the electrical energy to the external device based on the vehicle-facility distance and the drivable range to control electricity supply to the external device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a flowchart illustrating processing when an ECU controls electricity supply from a supply section to a load.

DESCRIPTION OF THE EMBODIMENTS

Figure 1:
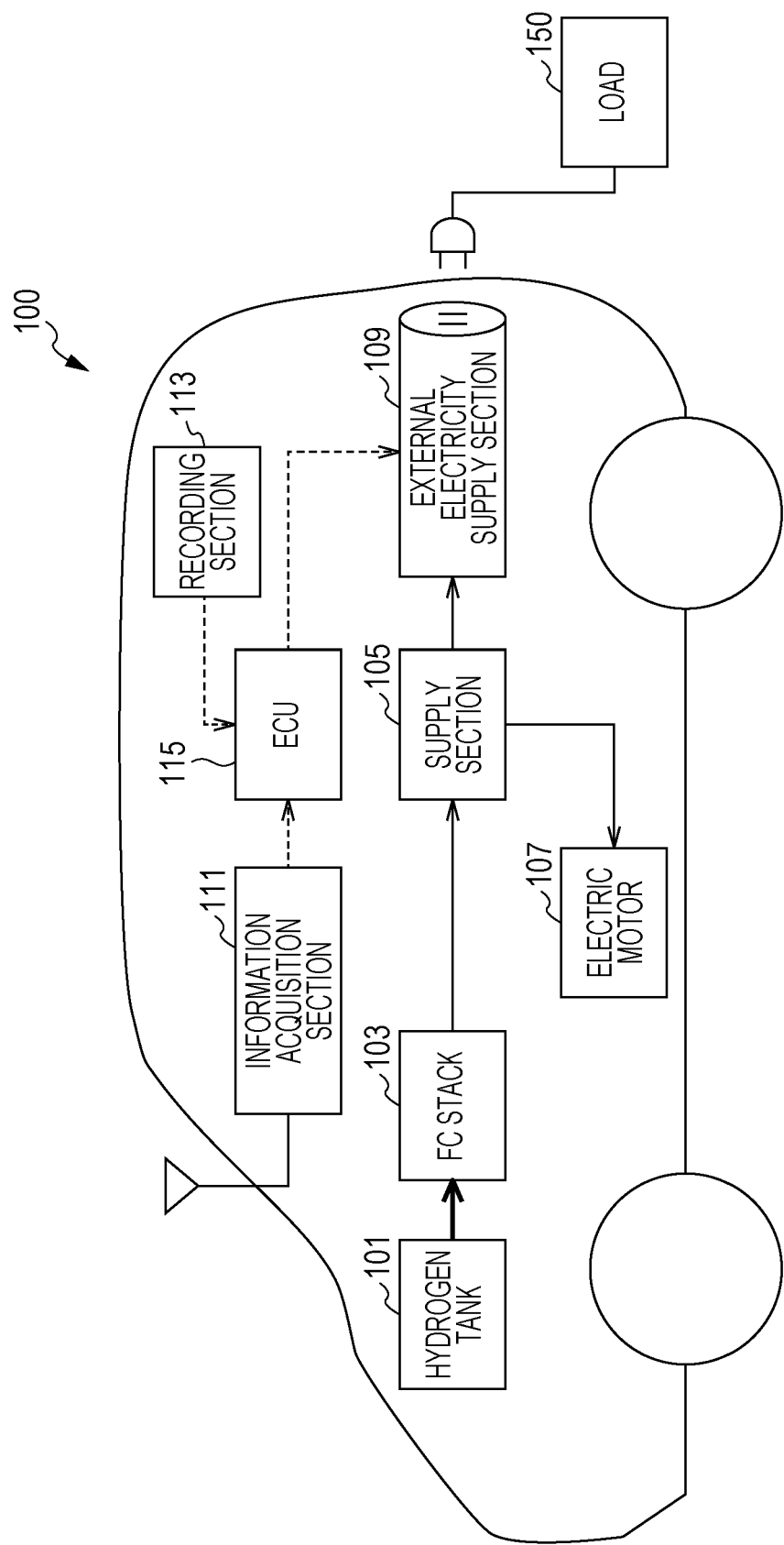
FIG. 1 is a block diagram illustrating an internal configuration of a fuel cell vehicle.

The embodiments will now be described with reference to the accompanying drawings, wherein like reference numerals designate corresponding or identical elements throughout the various drawings.

Explanation follows regarding embodiments of the present application, with reference to the drawings.

FIG. 1 is a block diagram illustrating an internal configuration of a fuel cell vehicle. A fuel cell vehicle (referred to below simply as "vehicle") 100 illustrated in FIG. 1 includes a hydrogen tank (an energy storage) 101, a fuel cell (FC) stack (an energy converter) 103, a supply section (a power supplier) 105, an electric motor 107, an external electricity supply section 109, an information acquisition section (an information acquiring device) 111, a recording section (a recorder) 113, and an electronic control unit (ECU) (a selector, a distance calculator, a drivable range calculator, and a determining device) 115. In FIG. 1 the solid arrow lines indicate power, the bold arrow line indicates hydrogen, and the intermittent arrow lines indicate a control signal or data.

The hydrogen tank 101 stores hydrogen as fuel to run the vehicle 100.

The FC stack 103 takes in hydrogen stored in the hydrogen tank 101 and oxygen in the air, and generates electrical energy by a chemical reaction.

The supply section 105 supplies electrical energy generated in the FC stack 103 to the electric motor 107 or to the external electricity supply section 109.

The electric motor 107 generates motive force to run the vehicle 100 using the electrical energy obtained from the supply section 105.

The external electricity supply section 109 converts the electrical energy obtained from the supply section 105 into a state capable of being supplied to a load (an external device) 150 external to the vehicle 100. The load 150 is a load operated by electrical energy.

The information acquisition section 111 utilizes a Global Positioning System (GPS) or the like to acquire information about the current position of the vehicle 100 (vehicle position information). The information acquisition section 111 utilizes a wireless communication network to communicate with an external server in order to acquire information regarding at least one facility capable of supplying hydrogen fuel (referred to below as a "hydrogen station" or a facility) and located in the surroundings (within a threshold distance) of the current position of the vehicle 100 (facility information). Information acquired by the information acquisition section 111 regarding each hydrogen station includes the position of the hydrogen station (a facility position), and the quantity of hydrogen fuel the hydrogen station is capable of supplying (an quantity of energy suppliable at the facility). The information acquisition section 111 may, when connected to a wireless communication enabled portable data terminal, acquire information regarding hydrogen stations through the portable data terminal.

The recording section 113 records the rate of consumption of hydrogen stored in the hydrogen tank 101 when the vehicle 100 is running (the rate of consumption of hydrogen to distance travelled).

Based on the information acquired by the information acquisition section 111 regarding hydrogen stations located in the surroundings of the current position of the vehicle 100, the ECU 115 sets one hydrogen station, from out of the at least one hydrogen station for which information has been acquired by the information acquisition section 111, as a target destination (a target facility) of the vehicle 100. Based on the distance from the current position of the vehicle 100 to the target destination (a vehicle-facility distance), and on the drivable range of the vehicle 100 corresponding to the quantity of hydrogen stored in the hydrogen tank 101, the ECU 115 controls whether or not electricity is supplied from the supply section 105 to the load 150 through the external electricity supply section 109.

Figure 2:
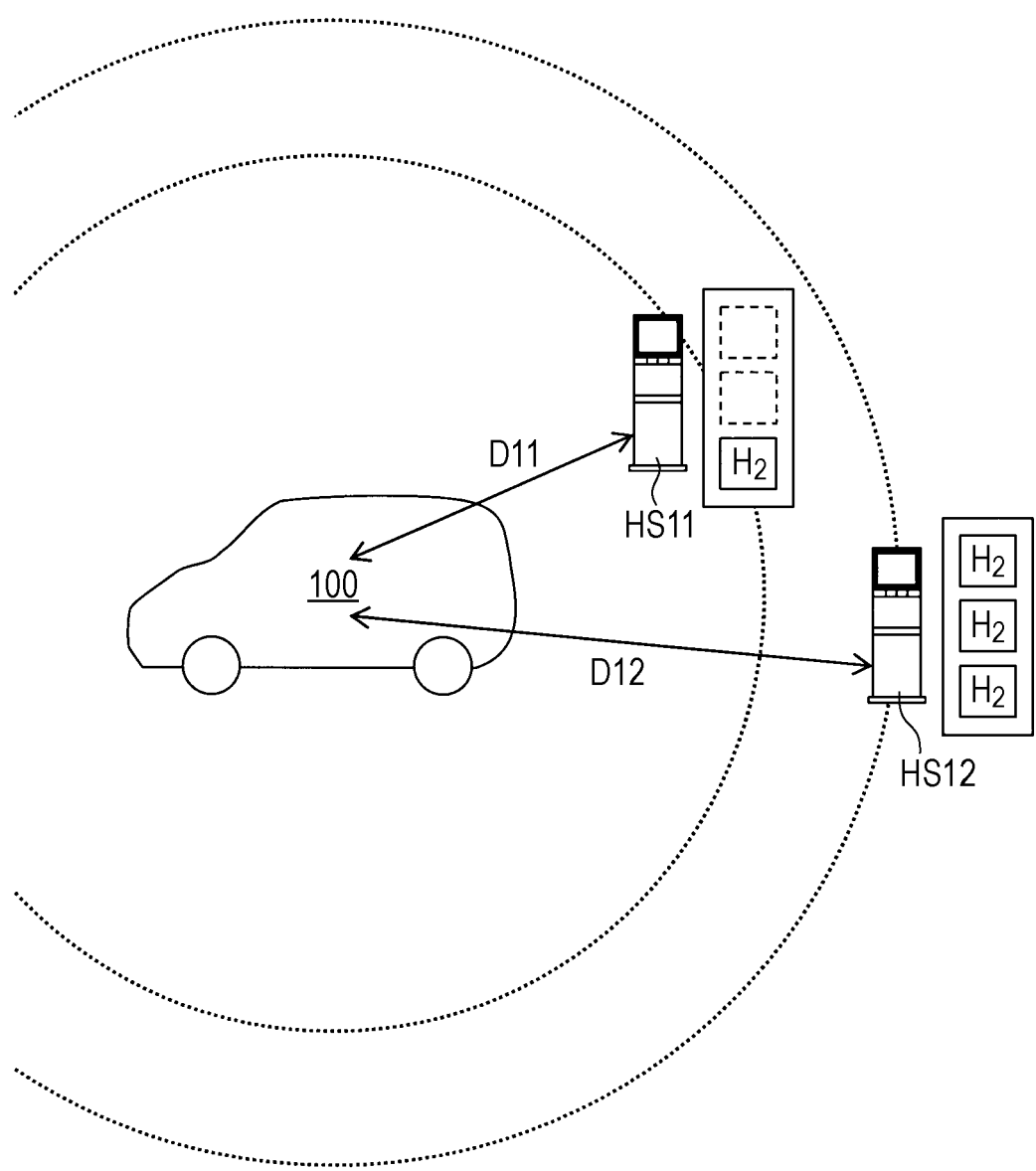
FIG. 2 is a diagram illustrating an example of respective distances from the position of a vehicle to two hydrogen stations, and respective quantities of hydrogen fuel each of the hydrogen stations is capable of supplying.

Explanation follows regarding an example of setting a target destination, as performed by the ECU 115, with reference to FIG. 2. FIG. 2 is a diagram illustrating an example of respective distances from the position of the vehicle 100 to two hydrogen stations HS11, HS12, and respective quantities of hydrogen fuel capable of being supplied at each of the hydrogen stations. The example in FIG. 2 illustrates a case in which the information regarding the hydrogen station HS11 and information regarding the hydrogen station HS12 is obtained by the information acquisition section 111 as information regarding hydrogen stations that are located in the surroundings of the current position of the vehicle 100 and that are capable of supplying hydrogen fuel. In this example, a distance D11 from the position of the vehicle 100 to the hydrogen station HS11 is shorter than the distance D12 to the hydrogen station HS12; however, the quantity of hydrogen fuel ($H_2$) capable of being supplied is greater at the hydrogen station HS12 than at the hydrogen station HS11. In such a situation, the ECU 115 sets the hydrogen station HS12 as the target destination if the quantity of hydrogen fuel the hydrogen station HS11 is capable of supplying is less than a threshold value, and sets the hydrogen station HS11 as the target destination if the quantity of hydrogen fuel the hydrogen station HS11 is capable of supplying is the threshold value or greater.

When setting the target destination for the vehicle 100 in this manner, setting does not only consider the distance from the current position of the vehicle 100 to the hydrogen stations, but also considers the quantity of hydrogen fuel capable of being supplied at each of the hydrogen stations. Thus, as long as there is enough hydrogen stored in the hydrogen tank 101 to enable the hydrogen station set as the target destination to be reached, the vehicle 100 will certainly be able to be supplied with hydrogen fuel at that hydrogen station.

The threshold value may be a value larger than the capacity of the hydrogen tank 101, may be a value equivalent to the capacity of the hydrogen tank 101, or may be a value that is the capacity of the hydrogen tank 101 multiplied by a value less than one.

When the threshold value is larger than the capacity of the hydrogen tank 101, the vehicle 100 will have some leeway, and will certainly be able to be supplied with hydrogen fuel at the hydrogen station set as the target destination. Furthermore, when the threshold value is a value equivalent to the capacity of the hydrogen tank 101, the vehicle 100 will certainly be able to be supplied with hydrogen fuel at that hydrogen station. Moreover, when the threshold value is a value of the capacity of the hydrogen tank 101 multiplied by a value less than one, the vehicle 100 will certainly be able to be supplied with a certain quantity of hydrogen fuel at that hydrogen station.

Figure 3:
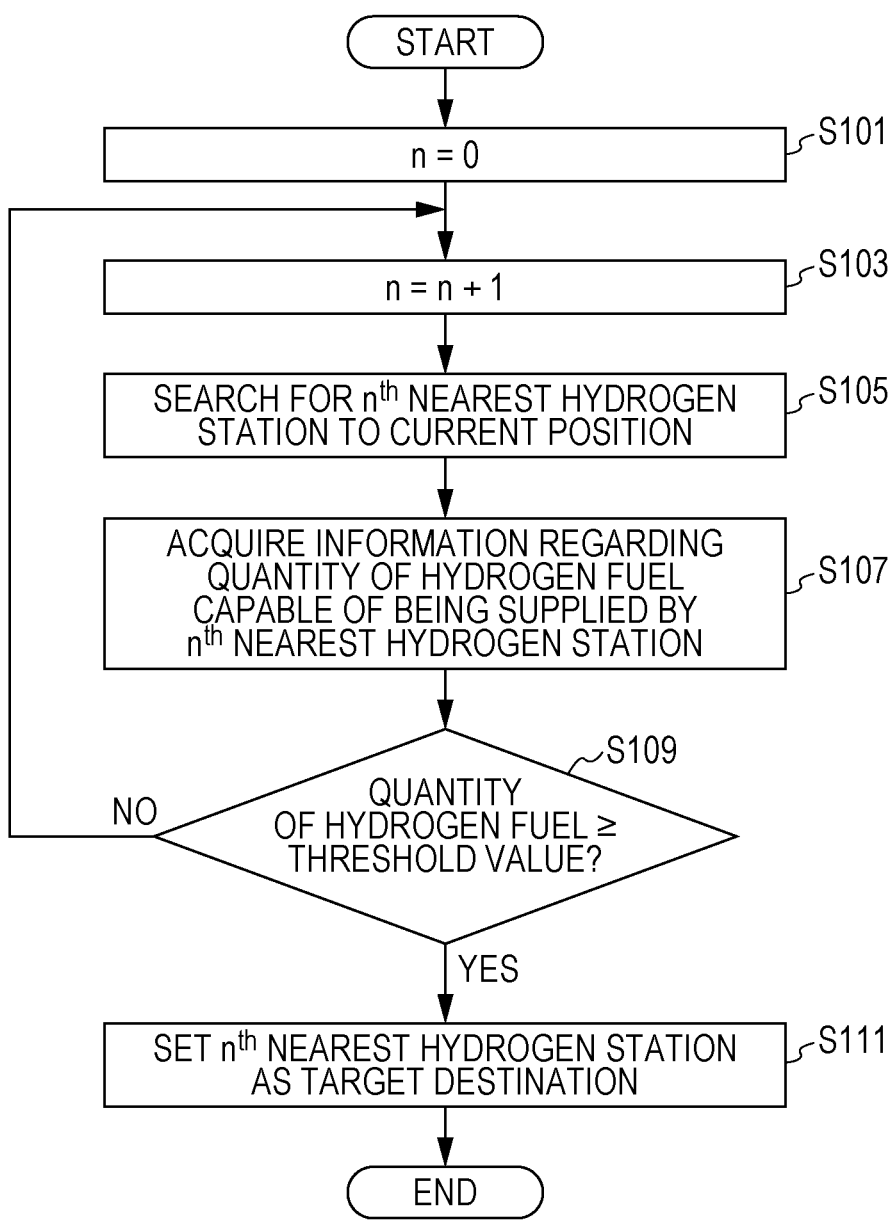
FIG. 3 is a flowchart illustrating processing when an ECU is setting a target destination.

FIG. 3 is a flowchart illustrating processing when the ECU 115 sets the target destination. As illustrated in FIG. 3, after setting the variable n to 0 (step S101), the ECU 115 then increments the variable n by 1 (step S103). Next, after finding the $n^{th}$ nearest hydrogen station to the current position of the vehicle 100 (step S105), the ECU 115 then acquires information indicating the quantity of hydrogen fuel capable of being supplied at the $n^{th}$ nearest hydrogen station (step S107). Next, the ECU 115 determines whether or not the quantity of hydrogen fuel acquired at step S107 is a threshold value or greater (step S109). Processing proceeds to step S111 if the quantity of hydrogen fuel is the threshold value or greater, and processing returns to step S103 if the quantity of hydrogen fuel is less than the threshold value. At step S111, the ECU 115 sets the $n^{th}$ nearest hydrogen station found at step S105 as the target destination.

Figure 4:
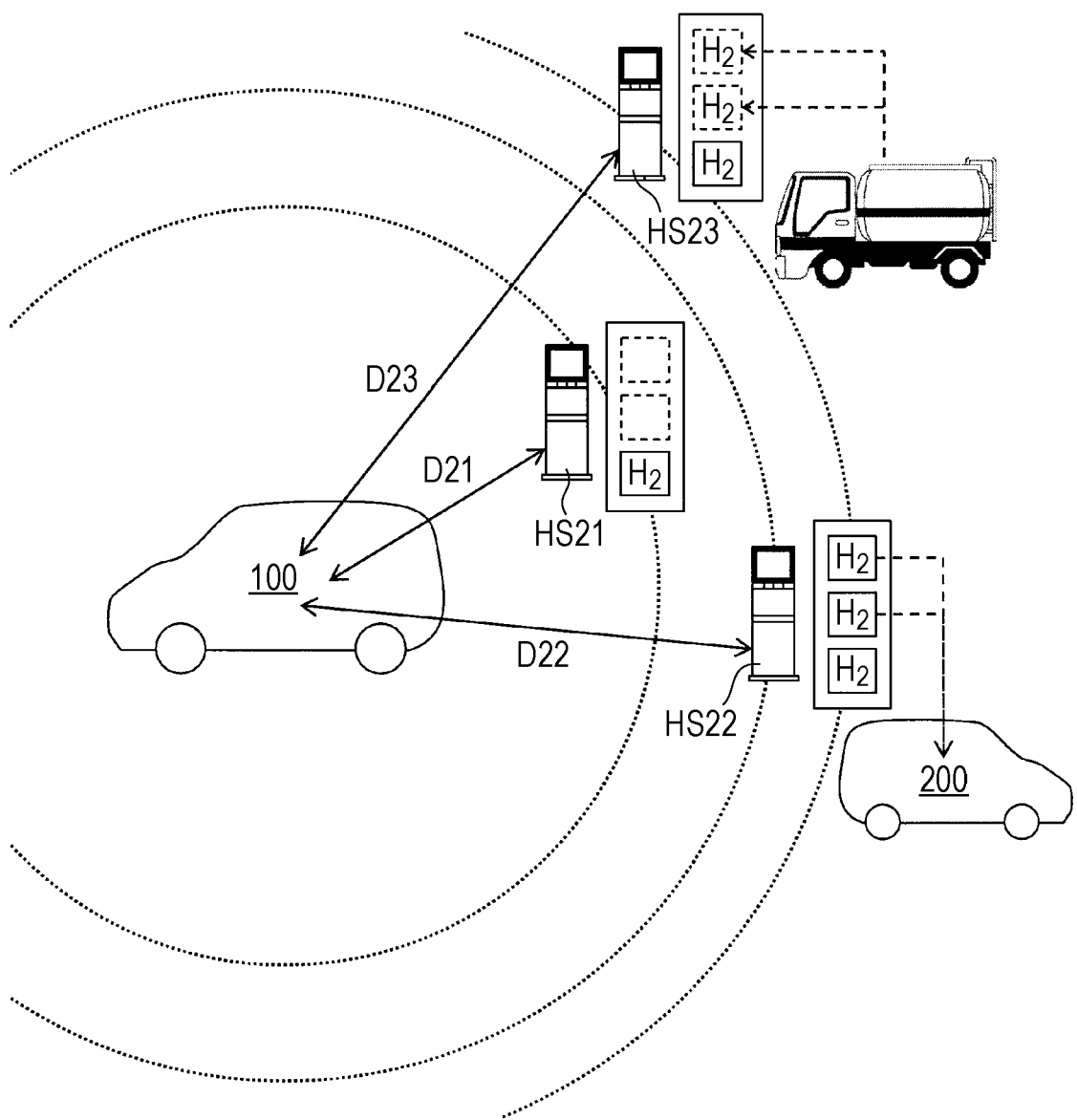
FIG. 4 is a diagram illustrating an example of each distance from the position of a vehicle to three hydrogen stations, and the quantity of hydrogen fuel each of the hydrogen stations is capable of supplying.

Next, explanation follows regarding another example of setting the target destination as performed by the ECU 115, with reference to FIG. 4. FIG. 4 is a diagram illustrating an example of respective distances from the position of the vehicle 100 to three hydrogen stations HS21, HS22, HS23 and respective quantities of hydrogen fuel capable of being supplied at each of the hydrogen stations. The example in FIG. 4 illustrates a case in which information regarding the hydrogen station HS21, information regarding the hydrogen station HS22, and information regarding the hydrogen station HS23 is obtained by the information acquisition section 111 as information regarding hydrogen stations that are located in the surroundings of the current position of the vehicle 100 and that are capable of supplying hydrogen fuel.

In the example in FIG. 4, the hydrogen station HS22 is scheduled to supply hydrogen fuel to another vehicle 200 prior to a duration (t2+Δt) elapsing, this being an anticipated required time t2 from the vehicle 100 departing its current position to the vehicle 100 reaching the hydrogen station HS22, plus a specific time Δt. Thus, a quantity that has been computed taking into account factors that reduce the quantity of hydrogen fuel held at the hydrogen station HS22 is obtained as the quantity acquired by the information acquisition section 111 for the hydrogen fuel the hydrogen station HS22 is capable of supplying.

In the example in FIG. 4, the hydrogen station HS23 is scheduled to be replenished with hydrogen fuel prior to a duration (t3+Δt) elapsing, this being an anticipated required time t3 from the vehicle 100 departing its current position to the vehicle 100 reaching the hydrogen station HS23, plus the specific time Δt. Thus, a quantity computed taking into account factors that increase the quantity of hydrogen fuel held at the hydrogen station HS23 is obtained as the quantity acquired by the information acquisition section 111 for the hydrogen fuel the hydrogen station HS23 is capable of supplying. The increase factors include, as well as replenishment of hydrogen fuel to the hydrogen station, such factors as generation of hydrogen fuel performed at the hydrogen station. Moreover, when the target destination is a charging station, for example, electricity generated from solar cells provided on the roof of the charging station may be included in the increase factors.

In the example in FIG. 4, a distance D21 from the position of the vehicle 100 to the hydrogen station HS21 is shorter than the distances D22, D23 to the hydrogen stations HS22, HS23. However, if the quantity of hydrogen fuel the hydrogen station HS21 is capable of supplying is less than the threshold value, then the hydrogen station HS21 is not set as the target destination. Next, if the quantity of hydrogen fuel at the $2^{nd}$ nearest hydrogen station HS22, taking into account the reduction factor, is less than the threshold value, the ECU 115 does not set the hydrogen station HS22 as the target destination. In such cases, if the quantity of hydrogen fuel at the $3^{rd}$ nearest hydrogen station HS23, taking into account the increase factor, is the threshold value or greater, the ECU 115 sets the hydrogen station HS23 as the target destination.

Thus, when setting the target destination of the vehicle 100, setting does not only consider the distances from the current position of the vehicle 100 to the hydrogen stations, but also considers the quantities of hydrogen fuel taking into account reduction factors and increase factors at each of the hydrogen stations. Thus, even though it takes time to reach the hydrogen station set as the target destination, and even though the quantity of energy each of the hydrogen stations is capable of supplying fluctuates before the target destination is reached, the vehicle 100 will certainly be able to be supplied with the hydrogen fuel at the hydrogen station set as the target destination when the vehicle 100 reaches the target destination.

The specific time Δt may be set based on a duration from the current time until completion of electricity supply from the supply section 105 to the load 150 through the external electricity supply section 109. By setting the specific time Δt in this manner, the reduction factors and increase factors that certainly may occur before the vehicle 100 reaches the hydrogen stations HS21 to HS23 are taken into account, enabling the quantity of hydrogen fuel the hydrogen stations HS21 to HS23 are capable of supplying to be computed.

Next, explanation follows regarding control by the ECU 115 of electricity supply from the supply section 105 to the load 150, with reference to FIG. 5. FIG. 5 is a flowchart illustrating processing of the ECU 115 in order to control electricity supply from the supply section 105 to the load 150.

As illustrated in FIG. 5, the ECU 115 computes a distance from the current position of the vehicle 100 to the hydrogen station set as the target destination (step S201). Next, the ECU 115 computes the drivable range corresponding to the quantity of hydrogen stored in the hydrogen tank 101 (step S203). The ECU 115 computes the drivable range based on the hydrogen consumption rate during travel before, or immediately before, the vehicle 100 arrived at the current position. The hydrogen consumption rate during travel before, or immediately before, the vehicle 100 arrived at the current position is recorded in the recording section 113 as the consumption rate during travel.

Generally the consumption rate is poor when supplying electricity from the supply section 105 to the load 150 through the external electricity supply section 109, since the vehicle 100 is not travelling. Thus, an accurate drivable range can be computed by computing the drivable range based on the hydrogen consumption rate during travel before, or immediately before, the vehicle 100 arrived at the current position. Moreover, since whether or not to supply electricity from the supply section 105 to the load 150 through the external electricity supply section 109 is controlled based on the accurate drivable range, the vehicle 100 is certain to be able to receive a supply of energy after arriving at the target destination facility, while still being able to supply a lot of electrical power to the load 150.

Next, the ECU 115 compares the drivable range (B) computed at step S203 against a distance that is the sum of the distance to the target destination (A) computed at step S201 and a specific distance (a) (step S205). Processing proceeds to step S207 when B<A+a, and proceeds to step S209 when B≥A+a. The ECU 115 prohibits electricity supply from the supply section 105 to the load 150 through the external electricity supply section 109 at step S207, or permits electricity supply from the supply section 105 to the load 150 through the external electricity supply section 109 at step S209. This processing is performed repeatedly at a specific control cycle while electricity is being supplied from the supply section 105 to the load 150 through the external electricity supply section 109.

As explained above, in this embodiment, when setting the target destination of the vehicle 100, setting not only considers the distance from the current position of the vehicle 100 to the hydrogen stations, but also considers the quantity of hydrogen fuel capable of being supplied at each of the hydrogen stations. Thus, even though electricity is supplied from the vehicle 100 to the load 150, whether or not to supply electricity is controlled such that the quantity of hydrogen stored in the hydrogen tank 101 does not drop below the quantity that enables the hydrogen station at the target destination to be reached, thereby enabling certainty that the vehicle 100 will be able to receive supply of hydrogen fuel after arriving at the target destination facility.

Moreover, the ECU 115 setting a hydrogen station having capability to supply a quantity of hydrogen fuel to the vehicle 100 of the threshold value or greater as the target destination enables the vehicle 100 to receive sufficient supply of hydrogen fuel after arriving at the hydrogen station at the target destination.

Moreover, due to the quantity of hydrogen fuel each of the hydrogen stations is capable of supplying taking into account reduction factors and increase factors, even if time is required to arrive at the hydrogen station at the target destination, and the quantity of energy each of the hydrogen stations is capable of supplying fluctuates before the target destination is reached, it is still possible to be certain that the vehicle 100 will be able to receive a supply of hydrogen fuel at the hydrogen station set as the target destination when the vehicle 100 has arrived at the target destination.

Moreover, when the ECU 115 computes the drivable range, they are computed based on the hydrogen consumption rate during travel before, or immediately before, the vehicle 100 arrived at the current position, thereby enabling accurate drivable range to be computed.

The present application is not limited by the embodiments described above, and appropriate modifications, improvements, and the like may be made. For example, although explanation has been given in the above embodiments of a case of a fuel cell vehicle, application may be made to vehicles in the hybrid electrical vehicle (HEV) series of vehicles in which electrical energy is generated by an internal combustion engine, running on gasoline as fuel, driving a generator. In such cases, the gasoline tank storing gasoline corresponds to the hydrogen tank 101, and the internal combustion engine and the generator correspond to the FC stack 103. Application may also be made to electric vehicles (EV) not performing energy conversion of hydrogen or gasoline into another form. In such cases, a charging station capable of charging a power storage unit installed in the EV, using power stored in batteries installed in a facility, this being a stationary electricity storage facility not continuously receiving power supply from a commercial power system, corresponds to the hydrogen station, and the quantity of power the charging station is capable of supplying corresponds to the quantity of hydrogen fuel the hydrogen station is capable of supplying.

A first aspect of technology disclosed herein is an electricity supply control apparatus including a storing section that stores energy (for example, a hydrogen tank 101 in an embodiment described above), a conversion section that converts the energy into electrical energy different from the energy (for example, an FC stack 103 in an embodiment described above), a supply section that supplies the electrical energy to a drive source of a vehicle or to a load external to the vehicle (for example, a supply section 105 in an embodiment described above), a control section that controls electricity supply from the supply section to the load (for example, an ECU 115 in an embodiment described above), and an acquisition section that acquires information regarding a current position of the vehicle, and information regarding at least one facility located in surroundings of the current position and capable of supplying the energy (for example, an information acquisition section 111 in an embodiment described above). The control section sets one facility from out of the at least one facility as a target destination based on a position of the facility and on a quantity of the energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the energy stored in the storing section.

A second aspect of technology disclosed herein may be the first aspect, further including a recording section that records a consumption rate of the energy during travel of the vehicle (for example, a recording section 113 in an embodiment described above). In the second aspect, the control section computes the drivable range based on the consumption rate that was recorded in the recording section before the supply section supplied electricity to the load at the current position.

A third aspect of technology disclosed herein may be the second aspect, wherein the control section computes the drivable range based on the consumption rate most recently recorded in the recording section before the supply section supplied electricity to the load at the current position.

A fourth aspect of technology disclosed herein may be any one of the first to the third aspects, wherein the control section sets, from out of facilities located in the surroundings of the current position that are capable of supplying the energy, a facility that is capable of supplying a quantity of the energy of a threshold value or greater to the vehicle and that is nearest to the current position as the target destination.

A fifth aspect of technology disclosed herein may be any one of the first to the fourth aspects, wherein the quantity of the energy the facility is capable of supplying is a quantity computed taking into account a reduction factor that reduces the quantity of the energy the facility is capable of supplying before the vehicle arrives at the facility.

A sixth aspect of technology disclosed herein may be any one of the first to the fifth aspects, wherein the quantity of the energy the facility is capable of supplying is a quantity computed taking into account an increase factor that increases the quantity of the energy the facility is capable of supplying before the vehicle arrives at the facility.

A seventh aspect of technology disclosed herein may be the fifth aspect, wherein the reduction factor includes supply of the energy by the facility to another vehicle different from the vehicle.

An eighth aspect of technology disclosed herein may be the sixth aspect, wherein the increase factor includes replenishment of the energy to the facility or generation of the energy at the facility.

A ninth aspect of technology disclosed herein is a vehicle including the electricity supply control apparatus of any one of the first to eighth aspects.

A tenth aspect of technology disclosed herein is an electricity supply control method performed by an electricity supply control apparatus including a storing section that stores energy (for example, a hydrogen tank 101 in an embodiment described below), a conversion section that converts the energy into electrical energy different from the energy (for example, an FC stack 103 in an embodiment described below), a supply section that supplies the electrical energy to a drive source of a vehicle or to a load external to the vehicle (for example, a supply section 105 in an embodiment described below), a control section that controls electricity supply from the supply section to the load (for example, an ECU 115 in an embodiment described below), and an acquisition section that acquires information regarding a current position of the vehicle, and information regarding at least one facility located in surroundings of the current position and capable of supplying the energy (for example, an information acquisition section 111 in an embodiment described below). In the electricity supply control method, the control section sets one facility from out of the at least one facility as a target destination based on a position of the facility and on a quantity of the energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the energy stored in the storing section.

An eleventh aspect of technology disclosed herein is an electricity supply control apparatus including a storing section that stores electrical energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the electrical energy. The control section sets one facility from out of the at least one facility as a target destination based on a position of the facility and on a quantity of the electrical energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the electrical energy stored in the storing section.

A twelfth aspect of technology disclosed herein is a vehicle including the electricity supply control apparatus of the eleventh aspect.

A thirteenth aspect of technology disclosed herein is an electricity supply control method performed by an electricity supply control apparatus including a storing section that stores electrical energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the electrical energy. In the electricity supply control method, the control section sets one facility from out of the at least one facility as a target destination based on a position of the facility and on a quantity of the electrical energy the facility is capable of supplying, included in the information regarding the at least one facility acquired by the acquisition section. The control section controls whether or not to supply electricity from the supply section to the load based on a distance from the current position to the target destination, and on a drivable range of the vehicle corresponding to a quantity of the electrical energy stored in the storing section.

According to the first aspect, the ninth aspect, and the tenth aspect of technology disclosed herein, when setting the target destination for a vehicle, setting does not only consider the distances from the current position of the vehicle to the facilities, but also considers the quantity of energy capable of being supplied at each facility. Thus, even though electricity is supplied from the vehicle to the load, as long as whether or not to supply electricity to the load is controlled based on a distance from the current position to the target destination, and on a drivable range of the vehicle corresponding to a quantity of the energy stored in the storing section, thereby giving certainty that the vehicle will be able to receive supply of energy after arriving at the target destination facility.

In the second aspect of technology disclosed herein, an accurate drivable range can be computed due to the drivable range being computed based on the hydrogen consumption rate during travel before the vehicle arrived at the current position, and not during supply of electricity from the vehicle to the load. Moreover, controlling whether or not to supply electricity from the supply section to the load based on the accurate drivable range enables certainty to be given that the vehicle will be able to receive supply of energy after arriving at the target destination facility, while still being able to supply a lot of electrical power to the load.

According to the third aspect of technology disclosed herein, due to the drivable range being computed based on the hydrogen consumption rate during travel immediately before the vehicle arrived at the current position, a more accurate drivable range can be computed. Moreover, controlling whether or not to supply electricity from the supply section to the load based on the more accurate drivable range enables certainty that the vehicle will be able to receive supply of energy after arriving at the target destination facility, while still being able to supply a lot of electrical power to the load.

According to the fourth aspect of technology disclosed herein, sufficient energy supply can be received after the vehicle has arrived at the target destination facility.

According to the fifth to the eighth aspect of technology disclosed herein, due to taking into account a reduction factor or an increase factor on the quantity of energy capable of being supplied at each of the facilities, even though it takes time to reach the target destination facility, and even though the quantity of energy each of the facilities is capable of supplying fluctuates before the target destination is reached, the vehicle will certainly be able to be supplied with the energy at the facility set as the target destination when the vehicle reaches the target destination.

According to the eleventh, twelfth, and thirteenth aspects of technology disclosed herein, when, for example, setting a stationary electricity storage facility not continuously receiving power supply from a commercial power system as the target destination of the vehicle, setting does not only consider the distances from the current position of the vehicle to the facilities, but also considers the quantity of electrical energy capable of being supplied at each facility. Thus, even though electricity is supplied from the vehicle to the load, whether or not to supply electricity to the load is controlled based on a distance from the current position to the target destination, and on a drivable range of the vehicle corresponding to a quantity of the electrical energy stored in the storing section, thereby enabling certainty that the vehicle will be able to receive supply of electrical energy after arriving at the target destination facility.

Obviously, numerous modifications and variations of the present invention are possible in light of the above teachings. It is therefore to be understood that within the scope of the appended claims, the invention may be practiced otherwise than as specifically described herein.

What is claimed is:

1. An electricity supply control apparatus comprising:
a storing section that stores energy;
a conversion section that converts the energy into electrical energy different from the energy;
a supply section that supplies the electrical energy to a drive source of a vehicle or to a load external to the vehicle;
a control section that controls electricity supply from the supply section to the load; and
an acquisition section that acquires information regarding a current position of the vehicle, and information regarding at least one facility located in surroundings of the current position and capable of supplying the energy; wherein
the control section:
sets one facility from out of the at least one facility as a target destination based on a position of the facility and on a quantity of the energy the facility is capable of supplying, included in the information regarding the at least one facility acquired by the acquisition section,
controls whether or not to supply electricity from the supply section to the load based on a distance from the current position to the target destination, and on a drivable range of the vehicle corresponding to a quantity of the energy stored in the storing section, and
calculates the quantity of the energy the facility is capable of supplying based on:
an arrival time of the vehicle from the current position to the facility; and an electricity supply time to complete supply of the electricity from the supply section to the load, wherein the control section repeats controlling whether or not to supply the electricity from the supply section to the load based on the distance and the drivable range while the supply section supplies the electrical energy to the load.

2. The electricity supply control apparatus according to claim 1, further comprising:

a recording section that records a consumption rate of the energy during travel of the vehicle, wherein the control section computes the drivable range based on the consumption rate that was recorded in the recording section before the supply section supplied electricity to the load at the current position.

3. The electricity supply control apparatus according to claim 2, wherein:

the control section computes the drivable range based on the consumption rate most recently recorded in the recording section before the supply section supplied electricity to the load at the current position.

4. The electricity supply control apparatus according to claim 1, wherein:

the control section sets, from out of facilities located in the surroundings of the current position that are capable of supplying the energy, a facility that is capable of supplying a quantity of the energy of a threshold value or greater to the vehicle and that is nearest to the current position as the target destination.

5. The electricity supply control apparatus according to claim 1, wherein the quantity of the energy the facility is capable of supplying is a quantity computed taking into account a reduction factor that reduces the quantity of the energy the facility is capable of supplying before the vehicle arrives at the facility.

6. The electricity supply control apparatus according to claim 5, wherein the reduction factor includes supply of the energy by the facility to another vehicle different from the vehicle.

7. The electricity supply control apparatus according to claim 1, wherein the quantity of the energy the facility is capable of supplying is a quantity computed taking into account an increase factor that increases the quantity of the energy the facility is capable of supplying before the vehicle arrives at the facility.

8. The electricity supply control apparatus according to claim 7, wherein the increase factor includes replenishment of the energy to the facility or generation of the energy at the facility.

9. A vehicle comprising the electricity supply control apparatus according to claim 1.

10. An electricity supply control method performed by an electricity supply control apparatus including a storing section that stores energy, a conversion section that converts the energy into electrical energy different from the energy, a supply section that supplies the electrical energy to a drive source of a vehicle or to a load external to the vehicle, a control section that controls electricity supply from the supply section to the load, and an acquisition section that acquires information regarding a current position of the vehicle, and information regarding at least one facility located in surroundings of the current position and capable of supplying the energy, the electricity supply control method comprising:

causing the control section to set one facility from out of the at least one facility as a target destination based on a position of the facility and on a quantity of the energy the facility is capable of supplying, included in the information regarding the at least one facility acquired by the acquisition section; and causing the control section to control whether or not to supply electricity from the supply section to the load based on a distance from the current position to the target destination, and on a drivable range of the vehicle corresponding to a quantity of the energy stored in the storing section, wherein the control section calculates the quantity of the energy the facility is capable of supplying based on:

an arrival time of the vehicle from the current position to the facility; and an electricity supply time to complete supply of the electricity from the supply section to the load, wherein the control section repeats controlling whether or not to supply the electricity from the supply section to the load based on the distance and the drivable range while the supply section supplies the electrical energy to the load.

11. An electricity supply control apparatus comprising:

an energy storage to store energy;

an energy converter to convert the energy into electrical energy;

a power supplier to supply the electrical energy to a drive source of a vehicle and to an external device external to the vehicle;

an information acquiring device to acquire vehicle position information regarding a current position of the vehicle and facility information regarding at least one facility which is located within a threshold distance from the current position and at which the energy is to be supplied to the energy storage, the facility information comprising:

a facility position where the at least one facility is located; and a quantity of the energy suppliable at the at least one facility;

a selector to choose a target facility from the at least one facility based on the facility position and the quantity of the energy suppliable;

a distance calculator to calculate a vehicle-facility distance from the current position to the facility position of the target facility;

a drivable range calculator to calculate a drivable range of the vehicle based on a quantity of the energy stored in the energy storage; and a determining device to determine whether or not to permit the power supplier to supply the electrical energy to the external device based on the vehicle-facility distance and the drivable range to control electricity supply from the power supplier to the external device, wherein the selector calculates the quantity of the energy suppliable to the vehicle at the at least one facility based on:

an arrival time of the vehicle from the current position to the at least one facility; and an electricity supply time to complete supply of the electrical energy from the power supplier to the external device, wherein the drivable range calculator repeats calculating the drivable range while the power supplier supplies the electrical energy to the external device, and wherein the determining device repeats determining whether or not to permit the power supplier to supply the electrical energy to the external device based on the vehicle-facility distance and the drivable range.

12. The electricity supply control apparatus according to claim 11, further comprising:
a recorder to record a consumption rate of the energy during travel of the vehicle, wherein
the drivable range calculator calculates the drivable range based on the consumption rate recorded in the recorder before the power supplier supplies electricity to the external device at the current position.

13. The electricity supply control apparatus according to claim 12, wherein:
the drivable range calculator calculates the drivable range based on the consumption rate most recently recorded in the recorder before the power supplier supplies electricity to the external device at the current position.

14. The electricity supply control apparatus according to claim 11, wherein:
the selector chooses a facility at which a quantity of the energy suppliable is equal to or greater than a threshold value and which is nearest to the current position as the target facility.

15. The electricity supply control apparatus according to claim 11, wherein the quantity of the energy suppliable is a quantity computed taking into account a reduction factor that reduces the quantity of the energy suppliable before the vehicle arrives at the target facility.

16. The electricity supply control apparatus according to claim 15, wherein the reduction factor includes supply of the energy by the target facility to another vehicle different from the vehicle.

17. The electricity supply control apparatus according to claim 11, wherein the quantity of the energy suppliable is a quantity computed taking into account an increase factor that increases the quantity of the energy suppliable before the vehicle arrives at the target facility.

18. The electricity supply control apparatus according to claim 17, wherein the increase factor includes replenishment of the energy to the target facility or generation of the energy at the target facility.

19. A vehicle comprising the electricity supply control apparatus according to claim 11.

20. An electricity supply control method comprising:
receiving vehicle position information regarding a current position of a vehicle and facility information regarding at least one facility which is located within a threshold distance from the current position and at which the energy is to be supplied to an energy storage, the energy stored in the energy storage being converted into electrical energy to be supplied to a drive source of a vehicle and to an external device external to the vehicle, the facility information comprising:
a facility position where the at least one facility is located; and
a quantity of the energy suppliable at the at least one facility;
choosing a target facility from the at least one facility based on the facility position and the quantity of the energy suppliable;
calculating a vehicle-facility distance from the current position to the facility position of the target facility;
calculating a drivable range of the vehicle based on a quantity of the energy stored in the energy storage; and
determining whether or not to supply the electrical energy to the external device based on the vehicle-facility distance and the drivable range to control electricity supply to the external device, wherein
the quantity of the energy suppliable at the at least one facility is calculated based on:
an arrival time of the vehicle from the current position to the at least one facility; and
an electricity supply time to complete supply of the electrical energy to the external device,
wherein the drivable range is repeatedly calculated while the electrical energy is supplied to the external device, and
wherein whether or not to supply the electrical energy to the external device based on the vehicle-facility distance and the drivable range is repeatedly determined while the electrical energy is supplied to the external device.

* * * * *